July 4, 1950  D. E. DAVIDSON ET AL  2,514,313
TILTABLE CAMERA MOUNT
Filed Feb. 19, 1946
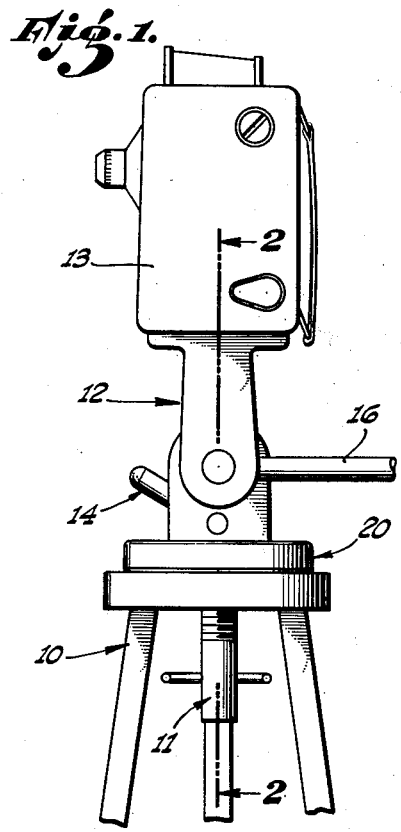
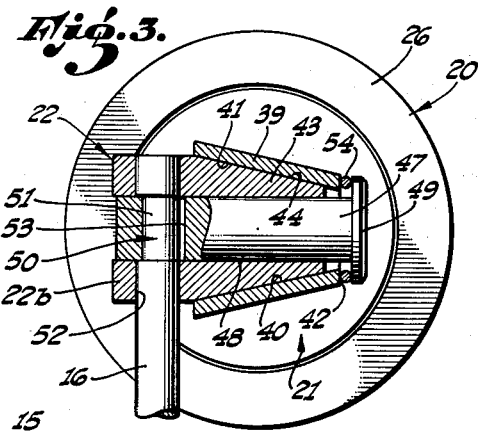
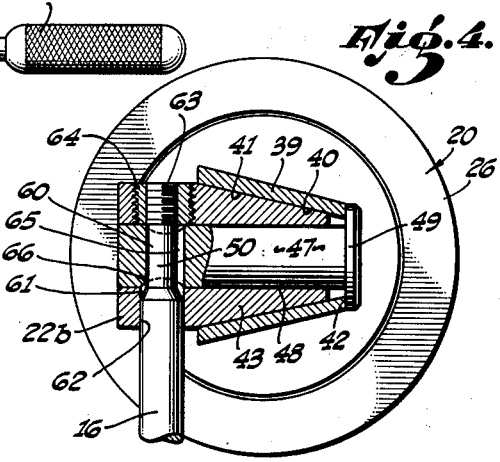
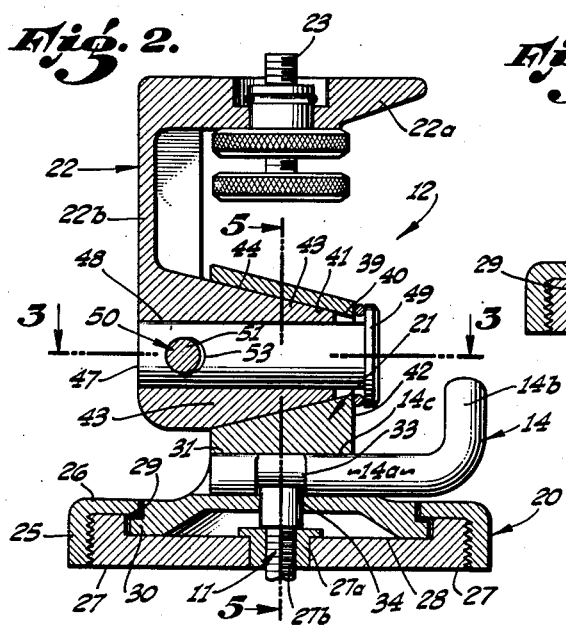
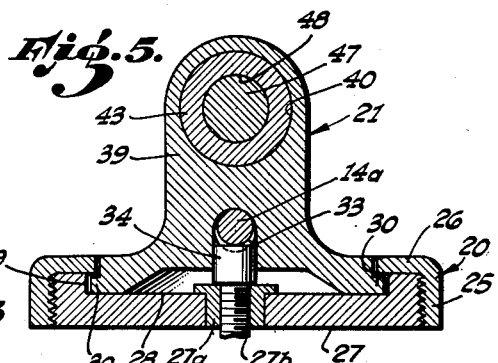
DONALD E. DAVIDSON,
FORREST J. LILLY,
INVENTORS
BY *Forrest J. Lilly*
ATTORNEY.

Patented July 4, 1950

2,514,313

UNITED STATES PATENT OFFICE 2,514,313

TILTABLE CAMERA MOUNT

Donald E. Davidson and Forrest J. Lilly, Los Angeles, Calif., assignors to Davidson Manufacturing Company, Los Angeles, Calif., a partnership Application February 19, 1946, Serial No. 648,599

7 Claims. (Cl. 248—183)

This invention relates generally to mountings for cameras and similar devices, and more particularly to such mounts in which the device to be supported may be moved about two mutually perpendicular axes while the primary supporting member remains stationary.

In the production of motion pictures, either amateur or professional, it is essential that the camera be held absolutely stationary during the photographing of most scenes if satisfactory results are to be obtained. In the photographing of other scenes, however, it is desirable that the camera be moved smoothly and steadily about either a vertical or horizontal axis or about both in order to follow the movement of an actor or for other similar reasons. To provide the desired stationary mounting for the camera, the tripod used to support it is built to provide a rigid foundation for the camera. If the camera is mounted directly on the tripod, extreme rigidity may be obtained, but movement of the camera is not possible without moving the tripod. To permit the necessary movement of the camera itself, mountings have previously been designed which are attached directly to the tripod, and to which the camera is attached, with the mounting providing the necessary freedom of motion about two mutually perpendicular axes.

It will be realized, of course, that it is not desirable to have the camera movable at all times when it is attached to the mounting, for under these conditions the desired rigidity of the tripod would be lost. Consequently, means have been provided in previous devices of this type to hold the camera against rotation about either of the axes unless a locking means has been released. Such locking means have been open to the serious objection that after relatively slight use, they become worn and permit movement of the camera about an axis other than that intended, i. e., the camera wobbles as it is being rotated.

It is therefore a major object of the invention to provide an improved mounting device for cameras and other similar objects, which provides a rigid mounting for the camera when locked.

It is a further object of the invention to provide such a mounting wherein two mutually perpendicular axes are provided for rotation of the camera, and each of these axes of rotation is so designed that wobbling of the camera about another axis is substantially reduced.

It is another object of the invention to provide such a mounting wherein improved locking means are used whereby a quick and positive lock may be secured by a small movement of the control member.

It is still another object of the invention to provide a mount of this type which is very simple to construct, may be easily disassembled for replacement of worn or broken parts, and which requires no special materials and a minimum of close tolerance machine work.

It is a still further object of the invention to provide a mounting which combines ease of operation with accuracy of movement and which may be manufactured at less cost than comparable devices.

These and other objects of this invention will become apparent from the following description of a preferred and an optional form thereof and from the drawings illustrating these forms, in which:

Figure 1 is a side elevational view of the improved mounting attached to a tripod, with a camera supported thereby;

Figure 2 is a cross-sectional view taken at 2—2 in Fig. 1 and showing the construction of the locking means;

Figure 3 is a cross-sectional view taken at 3—3 in Fig. 2 and illustrating the construction of the preferred form of cam used to operate the locking means and its method of mounting in the device;

Figure 4 is a cross-sectional view similar to Fig. 3, and showing the construction of the optional form of cam used to operate the locking means; and Figure 5 is a cross-sectional view taken at 5—5 in Fig. 2 and illustrating the construction of the cam and locking means used to prevent movement of the camera about a vertical axis.

Referring now to the drawings and particularly to Fig. 1, the numeral 10 indicates generally a tripod or other suitable type of support having an attaching means 11, usually in the form of a screw, adapted to secure a camera or other device to the tripod. Mounted on top of the tripod 10 is a pivotal mounting 12, while a camera 13 is shown attached to the pivotal mounting. The pivotal mounting 12 is designed to permit the camera 13 to be rotated about a vertical axis, and also to permit the camera to be rotated or tilted about a horizontal axis which would be perpendicular to the plane of the drawing. A locking lever 14 is provided to lock the pivotal mount 12 to prevent rotation about a vertical axis, and an operating handle 15 on an extension shaft 16 may be used to lock the mount against rotation about the horizontal axis and also to move the camera about either or both these axes when the mount is unlocked.

By reference to Fig. 2, it will be seen that the pivotal mount 12 includes a lower member 20, an intermediate member 21 which is pivotally attached to the lower member 20 for movement about a vertical axis, and an upper member 22 which is attached to the intermediate member 21 for pivotal movement about a horizontal axis. The upper member 22 includes a camera platform 22a provided with a camera securing means 23 which may take the form of a thumb screw adapted to fit into the usual opening in the camera housing.

To secure the intermediate member 21 to the lower member 20, the latter is preferably formed of two parts, the outer ring portion or shell 25 which has an inwardly extending shoulder 26, and the other or base portion 27 here shown in the form of an annular disk, which is received inside and screw-threadedly joined to the shell 25, and which forms a base adapted to rest upon the tripod head. Set into this base portion 27 is an insert 27a having a threaded socket 27b adapted to receive the tripod attaching screw 11. This base portion 27 has a centrally disposed annular recess 28 sunk in its upper surface and which is overhung somewhat by the shoulder 26, forming an annular inwardly facing channel 29. The lower end of the intermediate member 21 is provided with an outwardly extending annular flange 30 which fits into the annular channel or recess 29 just described, so that the intermediate member 21 is free to rotate with respect to the lower member 20, but is always attached to it. The bottom of the flange 30 is rotatably supported by the bottom of the recess 29, and the engaging surfaces are, of course, formed and machined to give smooth bearing, and to assure that the member 21 will rotate without wobbling. The upper surface of the flange 30 and the lower surface of the shoulder 26 are also machined so that when these two surfaces are forced together, a firm gripping action occurs which prevents the intermediate member 21 from rotating with respect to the base member 20.

To force the flange 30 upwardly against the shoulder 26, and so lock the intermediate member 21 against rotation on a vertical axis relative to the base, the following provisions are made. The aforementioned locking lever 14 comprises a cam shaft 14a and an operating lever or handle 14b extending at right angles from the shaft, and the shaft 14a is mounted in a hole 14c which extends substantially perpendicularly across the vertical axis of rotation of the intermediate member 21.

Sunk in the shaft 14a in a position to be substantially centered with respect to the vertical axis of rotation of the intermediate member 21 is an eccentric portion 33 (see Fig. 5) which acts as a cam. An abutment 34 consisting of a disk or post seating in the insert 27a bears against this eccentric 33 and is arranged to cooperate with the latter so that rotation of the cam shaft by means of its handle portion 14b forces the shaft upwardly to elevate the intermediate member 21 relatively to the base and thereby force the flange 30 upwardly into locking engagement against the shoulder 26. Fig. 5 shows the shaft 14a in unlocked position, and it will be evident that rotation from the position shown will bring that portion of the cam 33 which has a greater radius to bear on the abutment 34, and so cause a slight raising of the member 21 to clamp the device.

It will be apparent that the amount of movement of the locking member 14 necessary to lock and unlock the intermediate member 21 will be relatively small, and that because of the relatively large diameter of the flange 30, the lever arm of the force resisting rotation will be relatively large and the intermediate member will be securely held. Similarly, it will be seen that the large diameter of the flange 30 will hold the intermediate member 21 so that there will be little possibility of wobbling and other erratic movement as the intermediate member is moved about its vertical axis. In this way, a very positive locking of the intermediate member 21 is provided, and at the same time the intermediate member, when unlocked, rotates without wobbling. Both of these features are very desirable, and the lack of them has been a serious drawback in pivotal mounts previously available. Attention is drawn to the fact that the abutment 34 projects somewhat into the shaft hole 14c, and its reception within the cam groove confines the cam shaft against axial displacement.

The upper portion of the intermediate member 21 is in the form of a vertically disposed lug or post 39, which is horizontally pierced by a hole 40, preferably, and in this instance, conical or tapering in form, so as to present a bearing and a clutch or clamping surface 41. The side 42 of the post through which the smaller end of said hole 40 opens is faced off and machined at right angles to the axis of said hole. It will be seen that the bearing surface 41 formed by this conical hole 40 presents an annular projected area (as viewed looking into the larger end of the hole) that faces oppositely to the aforementioned machined surface 42. The camera supporting member 22 includes a vertically disposed arm portion 22b extending downwardly from one edge of platform 22a, and a frusto-conical pivot joint member 43 extending laterally from the lower end of arm 22b and formed with a bearing and clutch surface 44 which is complemental to and rotatably engages the aforementioned bearing and clutch surface 41. It is to be understood, however, that while a frusto-conical form is preferred for the described inter-engaging bearing surfaces 41 and 44, in a broad view it is only necessary that the surface 41 face oppositely from (or have a projected area facing oppositely from) the surface 42, whereby later described clamping means abutting against the surface 42 and acting on the joint member 43 to draw the latter toward said surface 42 will clamp the surface 44 against the surface 41. The frusto-conical or taper type of bearing is however preferred, as it assures a high degree of uniformity of movement, as well as an exceptionally tight clamping or clutching action.

The aforementioned clamping means embodies a clamping bolt or shaft 47 slidably fitted in a longitudinal bore 48 extending coaxially through the pivot joint member 43 and provided with a head or other abutment 49 adapted to engage or shoulder against the clamping surface 42, and a cam means 50 supported by the member 43 and engageable with the shaft 47 to draw said shaft further into the bore 48 and thereby effect a tight pressural engagement between the bearing surfaces 44 and 41. In accordance with the present preferred embodiment of the invention, this cam means 50 embodies an eccentric section 51 formed on the inner portion of the aforementioned extension shaft 16 and arranged for operative engagement with the clamping shaft 47, the shaft 16 being journalled in the pivot joint member 43 immediately to the rear of the supporting post 39. Thus, the shaft 16 is clearly seen in Fig. 3 to be journalled in a transverse bore 52 extending completely through member 43. A hole 53, preferably the same size as bore 52, extends through clamping shaft 47 in a direction perpendicular to the axis of the latter, and the eccentric portion 51 bears against the sides of the hole. A spring, such as a so-called split or spring washer 54, is placed between the head 49 of the clamping shaft 47 and the surface 42, and urges the head of the shaft away from the eccentric portion 51, thereby causing the shaft to follow the movement of the eccentric at all times. With the parts in the position shown in Fig. 3, the bearing surfaces 41 and 44 are not pressed together in locking engagement, and the member 43 may be turned with respect to member 39. However, as the shaft 16 is rotated, eccentric portion 51 turns, forcing clamping shaft 47 to the left and compressing spring 54; and a clamping action occurs which forces bearing surfaces 41 and 44 together in locking engagement.

In the assembly of this device, the member 43 is inserted in member 39, and clamping shaft 47 is inserted in bore 48. If the spring 54 is omitted for the time being, hole 53 may easily be aligned with bore 52, and shaft 16 may be inserted therein, with eccentric portion 51 extending through hole 53. The eccentric portion 51 is then turned until it permits the greatest displacement of clamping shaft 47 to the right, and the spring 54 may then be slipped on the shaft between the head 49 thereof, and the surface 42. As an optional method of assembly, the spring 54 may be slipped over shaft 47 before the latter is inserted in bore 48; and an external clamp, such as a vise, may be used to force the clamping shaft 47 into the member 43 until the bore 52 and hole 53 are in alignment, at which time the shaft 16 may be inserted, and the external clamp then removed.

An optional form of clamp is shown in Fig. 4, where similar numerals indicate the same parts as those previously described. Thus, the supporting post 39 has a hole 48 therein which forms a bearing surface 41, oppositely directed from surface 42. A pivot joint member 43, formed as an extension of vertical arm portion 22b, has a bearing surface 44 which cooperates with bearing surface 41; and a clamping shaft 47 is fitted in a bore 48 and has a head 49 which bears against surface 42. The cam means 50 is operated by the shaft 16, and draws the bolt 47 into the pivot joint member 43; but the method of accomplishing this is different from the method used in the preferred form.

In the optional form shown in Fig. 4, the shaft 16 is provided with a section 60 of reduced diameter, concentric with the principal portion of the shaft 16; and a tapered portion 61 extends between the larger portion and the smaller portion. The larger section of the shaft 16 is journaled in a transverse bore 62 in one side of member 43, and the smaller section is provided with screw-threads 63 on its end which fit into and coact with the internal threads of a bushing 64 located on the other side of member 43 and aligned with bore 62. Bushing 64 is of the internally and externally threaded type, and is threadedly held in member 43, and preferably locked against rotation. Rotation of shaft 16 will thus rotate the threads 63 with respect to the bushing 64, and the shaft will move into or out of member 43. Since shaft 16 will generally be formed of a relatively hard material, such as iron or steel, and since the member 43 may advantageously be cast of a relatively soft material, such as aluminum or magnesium, the bushing 64 is provided so that the threads 63, which are frequently rotated, will not cause the threads in the softer material to become worn. Bushing 64 is preferably formed of a wear resistant material, but since it does not rotate with respect to member 43, the softer material of the latter will not be worn away. However, the relatively hard material of which the bushing 64 and threads 63 are formed will resist wear for a long period of use.

To permit the smaller portion 60 of the shaft 16 to extend through the member 43, the clamping shaft 47 is provided with a transverse hole 65 whose axis is perpendicular to the axis of the clamping shaft and slightly larger in diameter than the reduced portion 60. The edge 66 of the hole 65 which is adjacent the tapered section 64 is beveled, preferably at an angle corresponding to that of the tapered section; and the axis of the hole is offset from the axis of the shaft 16 in a direction toward the head 49 of the clamping shaft 47. The amount of offset is small, so that the reduced portion 60 may be passed through the hole 65 without forcing the clamping shaft 47 into the member 43; however, the offset is great enough to provide a strong clamping action, in a manner now to be described, even after long continued usage.

The clamping action mentioned is secured by drawing the clamping shaft 47 into the member 43, thereby causing the head 49 of the shaft to bear against the surface 42 and force the surfaces 41 and 44 together, all as previously described. The clamping shaft 47 is drawn into the member 43 by the action of the tapered section 61 of shaft 16 acting upon the beveled edge 66 of the hole 65. As the extension shaft 16 is rotated, the threads 63 draw the shaft into the bushing 64, and the tapered portion 61 moves inwardly to bear against the beveled edge 66. The clamping shaft 47 is thus moved inwardly, and its head 49 bears against the surface 42 to force the surfaces 41 and 44 into locking engagement; and in the limiting position of the shaft, the hole 65 will be coaxial with the transverse bore 62. However, to allow for wear, the device is preferably designed so that the surfaces 41 and 44 are held in locking engagement before the limiting position is reached. To release the member 43, the shaft 16 is rotated in the opposite direction, causing the tapered portion 61 to be backed away from the beveled edge 66, and permitting the clamping shaft 47 to be loosened. It should be noted that in this form, a spring is not used between the head 49 of the shaft 47, and the surface 42.

To complete the mount, an attaching screw 23, previously mentioned, is mounted in the horizontal platform 22a of the upper member 22 on which the camera 13 may rest and be held. The construction of such attaching members is well known in the art and need not be discussed here.

In use, the tiltable mount is secured to the tripod 10 by means of the tripod screw 11 which extends into the threaded opening 27b of the lower member 20. This lower member is thus securely held to the tripod; and if the tripod is firm, the lower member is held equally firm and cannot rotate or wobble. With the locking member 14 in unlocked position, the abutment 34 bears against the low portion of the cam surface 33 so that the intermediate portion 21 is not forced upwardly and its shoulder 30 is not forced into engagement with the flange 26. Instead, the two surfaces are separated a slight amount, and the member 21 is thus free to rotate about a vertical axis which normally passes through the center of the attaching screw 11 of the tripod 10. Since no movement of the upper member 22 with respect to the intermediate member 21 is possible about the vertical axis, these two members may be rotated as a unit, and similarly may be locked against movement about this axis by operation of the locking member 14.

To pivot the upper member 22 about a horizontal axis, the operating handle 15 is rotated so as to cause the cam means 50 to move the shaft 47 to the right, in Figs. 3, or 4, thereby releasing the pivot joint member 43 from the vertically disposed post 39 and freeing the upper member for rotation about the horizontal axis of the bearing and clutch surfaces 41 and 44. When it is desired to lock the upper member 22 against rotation about the horizontal axis, the operating handle 15 is rotated so as to force the shaft 47 to the left, in Figs. 2, 3, and 4, thereby exerting a clamping force which draws the clutch and bearing surfaces firmly together so that they engage and frictionally hold the upper member 22 against further movement about the horizontal axis.

It is to be noted that the operating handle 15 is attached to the upper member 22 by extension shaft 16 so that if the clutch and bearing surfaces 41 and 44 are disengaged, the upper member 22, and consequently the camera 13, may be rotated about a horizontal axis by moving the handle 15 about that same axis. Similarly, if the lower locking member 14 is in released position, the handle 15 may be rotated about the vertical axis to turn the intermediate member 21, the upper member 22, and the camera 13 about the vertical axis. By having the lower locking member 14 and the operating handle 15 both in unlocked position, the camera 13 may be simultaneously and independently rotated about the vertical and horizontal axes of rotation of the mounting 12.

All of the clutch type locking means used are designed so that positive locking is assured, and wobbling or other erratic movement about an unintended axis is reduced to a minimum by reason of the relative rigidity of the two bearing surfaces. The use of these types of bearing surfaces results in a device in which the effects of wear are minimized, and the precision control available with this mount is retained for a much longer period of time than that possible with other mounting devices having other forms of clamping means.

While a preferred and optional form of this invention has been shown and described, it is to be understood that the invention is not to be limited to the particular form or arrangement of parts herein shown and described except insofar as is necessary by the following claims.

We claim:

1. A mount of the character described which includes: a supporting member rotatable in a horizontal plane and provided with an upwardly projecting lug, said lug having a horizontally disposed hole extending therethrough, oppositely facing bearing surfaces on said lug around said hole, a pivot joint member having a bearing surface rotatably coacting with one of said bearing surfaces on said lug, and having an aperture alined with said hole in said lug, a clamp shaft received for relative longitudinal movement in said hole and said aperture, a shoulder on said shaft facing and rotatably coacting with the other bearing surface on said lug, and cam means supported on said pivot joint member cooperable with said clamp shaft to draw said clamp shaft toward said pivot joint member whereby said member and said shoulder exert a clamping force on said bearing surfaces of said lug, and thereby prevent rotation between said pivot joint member and said lug.

2. A device as defined in claim 1 wherein said cam is formed on an extension shaft rotatably mounted in said pivot joint member and serving as a handle by which the cam may be operated, and by which the pivot joint member may be rotated when unclamped from said lug.

3. A mount of the character described which includes: a supporting member rotatable in a horizontal plane and provided with an upwardly projecting lug, said lug having a horizontally disposed tapered hole extending therethrough, a bearing face on the surface of said lug penetrated by the smaller end of said tapered hole, a pivot joint member embodying a frusto-conical element rotatably received within and coacting with said tapered hole, said frusto-conical element having an axial bore, a clamp shaft received for relative longitudinal movement in said bore, a shoulder on said clamp shaft facing and coacting with said bearing face on said lug, and cam means supported on said pivot joint member cooperable with said clamp shaft to draw said clamp shaft along said axial bore whereby said frusto-conical element and said shoulder exert a clamping force on said lug.

4. A mount of the class described which includes: a base member; a central member having a conical recess; a first clutch means connecting said central member to said base member; a first cam means movable to operate said first clutch means to lock and unlock said central member for rotation with respect to said base member; a pivot joint member having a conical surface adapted to cooperate with said conical recess to form a second clutch means; shaft means coaxial with said second clutch means and connecting said central and said pivot joint members together for rotation with respect to each other when said clutch surfaces are disengaged, said shaft means having an opening therein extending substantially perpendicular to its axis; a shoulder piece on said shaft means adapted to bear against said central member; a cam mounted in said pivot joint member and extending into said opening in said shaft means, whereby rotation of said cam moves said central and said pivot joint members with respect to each other to effect engagement or disengagement of said second clutch means, said pivot joint member being held against rotation with respect to said central member when said second clutch means is engaged; and extension means connected to said pivot joint member, and adapted to operate said cam and to rotate said pivot joint member.

5. A mount of the character described which includes: a supporting member rotatable in a horizontal plane and provided with an upwardly projecting lug, said lug having a horizontally disposed hole extending therethrough, oppositely facing bearing surfaces on said lug around said hole, a pivot joint member having a bearing surface rotatably coacting with one of said bearing surfaces on said lug, and having an aperture alined with said hole in said lug, a clamp shaft received for relative longitudinal movement in said hole and said aperture, a shoulder on said shaft facing and rotatably coacting with the other bearing surface on said lug, a transverse bore extending through said pivot joint member to one side of said lug, said bore intersecting said aperture in said pivot joint member, an opening in said clamp shaft in alinement with said bore, an extension handle shaft extending through and arranged for rotation in said transverse bore in said pivot joint member, and cam means on said shaft disposed within said opening in said clamp shaft to be cooperable with said clamp shaft to draw said clamp shaft toward said pivot joint member whereby said member and said shoulder exert a clamping force on said bearing surfaces of said lug, and thereby prevent rotation between said pivot joint member and said lug.

6. A mount of the character described which includes: a supporting member rotatable in a horizontal plane and provided with an upwardly projecting lug, said lug having a horizontally disposed tapered hole extending therethrough, a bearing face on the surface of said lug penetrated by the smaller end of said tapered hole, a pivot joint member embodying a frusto-conical element rotatably received within and coacting with said tapered hole, said frusto-conical element having an axial aperture, a clamp shaft received for relative longitudinal movement in said aperture, a shoulder on said clamp shaft facing and coacting with said bearing face on said lug, a transverse bore extending through said pivot joint member to one side of said lug, said bore intersecting said aperture in said pivot joint member, an opening in said clamp shaft in alinement with said bore, an extension handle shaft extending through and arranged for rotation in said transverse bore in said pivot joint member, and cam means on said shaft disposed within said opening in said clamp shaft to be cooperable with said clamp shaft to draw said clamp shaft in an axial direction whereby said frusto-conical element and said shoulder exert a clamping force on said lug.

7. A mount of the character described which includes: a supporting member rotatable in a horizontal plane and provided with an upwardly projecting lug, said lug having a horizontally disposed hole extending therethrough, oppositely facing bearing surfaces on said lug around said hole, one of said bearing surfaces on said lug being frusto-conical in form, a pivot joint member having a frusto-conical bearing surface mating said frusto-conical bearing surface on said lug, and having an aperture therethrough which is axially disposed relative to said frusto-conical bearing surfaces, a clamp shaft received for relative longitudinal movement in said hole and said aperture, a shoulder on said shaft facing and rotatably coacting with the other bearing surface on said lug, a transverse bore extending through said pivot joint member to one side of said lug, said bore intersecting said aperture in said pivot joint member, an opening in said clamp shaft in alinement with said bore, an extension handle shaft extending through and arranged for rotation in said transverse bore in said pivot joint member, and cam means on said shaft disposed within said opening in said clamp shaft to be cooperable with said clamp shaft to draw said clamp shaft in an axial direction whereby said frusto-conical bearing surface on said pivot joint member and said shoulder on said clamp shaft exert a clamping force on said lug.

DONALD E. DAVIDSON.
FORREST J. LILLY.

REFERENCES CITED

The following references are of record in the file of this patent:

UNITED STATES PATENTS

| Number | Name | Date |
| --- | --- | --- |
| 1,894,456 | Zerk | Jan. 17, 1933 |
| 2,261,426 | Willcox | Nov. 4, 1941 |
| 2,318,910 | Zucker | May 11, 1943 |
| 2,360,907 | Stoner | Oct. 24, 1944 |
| 2,434,829 | Bentzman | Jan. 20, 1948 |
| 2,458,872 | Pagliuso | Jan. 11, 1949 |

FOREIGN PATENTS

| Number | Country | Date |
| --- | --- | --- |
| 373,820 | Great Britain | 1932 |